United States Patent [19]
Quartullo

[11] 3,851,916
[45] Dec. 3, 1974

[54] BIG GAME FISHING CHAIR

[76] Inventor: Orpheus F. Quartullo, 230 Nurmi Dr., Ft. Lauderdale, Fla. 33301

[22] Filed: Apr. 16, 1973

[21] Appl. No.: 351,193

[52] U.S. Cl.............. 297/188, 43/21.2, 272/72, 272/79 R, 297/217
[51] Int. Cl............................................. A47c 7/62
[58] Field of Search............ 297/217, 317, 188; 43/21.2, 1; 272/72, 79 R

[56] References Cited
UNITED STATES PATENTS
1,223,884  4/1917  Johnstone..................... 297/217 X
1,707,791  4/1929  Anderson..................... 272/79 R X Primary Examiner—James C. Mitchell
Attorney, Agent, or Firm—Oldham & Oldham Co.

[57] ABSTRACT

The invention provides a fishing chair, especially for large game fish, in which the heavy leg muscles of the fisherman, such as the thigh muscles, can be used to play and tire the fish rather than using the arm muscles.

6 Claims, 4 Drawing Figures

BIG GAME FISHING CHAIR

SUMMARY OF THE INVENTION

The provision of a fishing chair utilizing leg muscle control necessitates a base, a foot rest on the base, a chair slidably mounted on the base and movable towards and from the foot rest, a socket to receive the fishing rod butt and pivotally mounted on the base between the chair and the foot rest, and means connecting the chair and the fishing rod so that as the chair slides back and forth on the base under the control of the fisherman's legs the rod is continuously pumped from the inclined to the vertical.

It is the general object of the invention to provide an improved fishing chair characterized by leg muscle control, adjustability to different size of fisherman or fishing rod, durability of design and work ability, beauty in appearance, and excellence of function.

The fighting of really big game fish, such as marlin and tuna, can be an extremely back breaking and arm exhausting experience. Another object of the invention is to overcome or at least alleviate the difficulty.

For a better understanding of the invention reference should be had to the accompanying drawings wherein.

Figure 1:
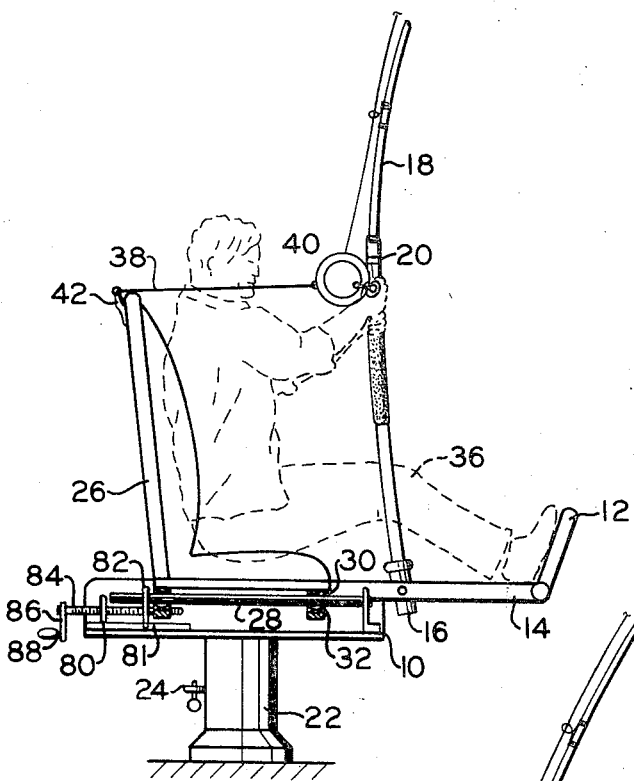
FIG. 1 is a side elevation of a diagrammatically illustrated fishing chair of the invention showing the fisherman's legs straightened and rod tip high.

In the drawings, the numeral 10 indicates a base to which is adjustably secured a foot rest 12 by extending flat bars 14. The base 10 pivotally supports a socket 16 adapted to receive the butt end of a fishing rod 18 upon which a reel 20 is secured.

The base 10 is mounted on a pedestal 22 for movement around a vertical axis, but having a quick release clamp 24 for securing the base against movement around the vertical axis when the chair is not in use.

A chair 26 is slidably mounted on the base 10 for movement to and from the foot-rest 12. This is achieved by providing a pair of parallel rods 28 on the base 10. Downwardly extending brackets 30 on the underside of chair 26 carry bearings 32 slidably engaging the rods 28 whereby the chair 26 slides forward and back on the base 10 a limited distance, for example, 9 inches in one embodiment of the chair.

Figure 2:
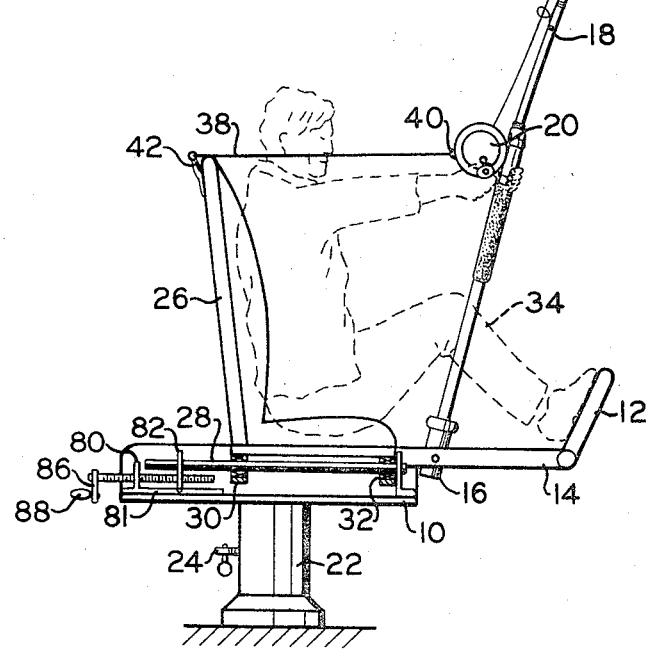
FIG. 2 is a view like FIG. 1 but showing the fisherman's legs bent and rod tip lowered.

The distance that the chair 26 moves fore and aft on the base 10 is such as to allow a fisherman (shown in dash lines in FIGS. 1 and 2) to move from bent knees 34, seat forward position of FIG. 2, to a substantially straight knees 36, seat back position of FIG. 1.

The fore and aft movement of the chair 26 on the base 10 moves the fishing rod 18 from the rearwardly inclined position of FIG. 2 into substantially the vertical position of FIG. 1. This is because the butt of the rod is received in the socket 16, which pivots fore and aft, but which is mounted on the base 10. Also, a flexible cable 38 has two ends which releasably snap to the fishing reel 20 at 40, and with the cable being adjustably secured to the chair back at 42. This cable establishes an adjustably fixed distance between the rod and the chair, and acts as a restraining means.

Thus, as the fisherman moves repeatedly from FIG. 2 to FIG. 1 to FIG. 2 the rod is "pumped." During the movement from FIG. 2 to FIG. 1, the heavy thigh muscles of the fisherman move the chair 26 along the rods 28 on the base 10. This causes the rod 18 to be given, as well as the fish thereon, a slow steady pull from an inclined positioned toward the fish into the vertical to thereby pull the fish in toward the boat, all without the drag on the reel slipping.

A quick return movement of the chair 26 from the position of FIG. 1 to that of FIG. 2 allows the fisherman to very momentarily get a little easing of the tension on the fish line, and a few turns of line on the fishing reel by quickly winding thereon.

It is the continuous repetition of this "pumping" action which gradually tires out the game fish, and brings it within gaffing distance of the fishing boat.

Figure 3:
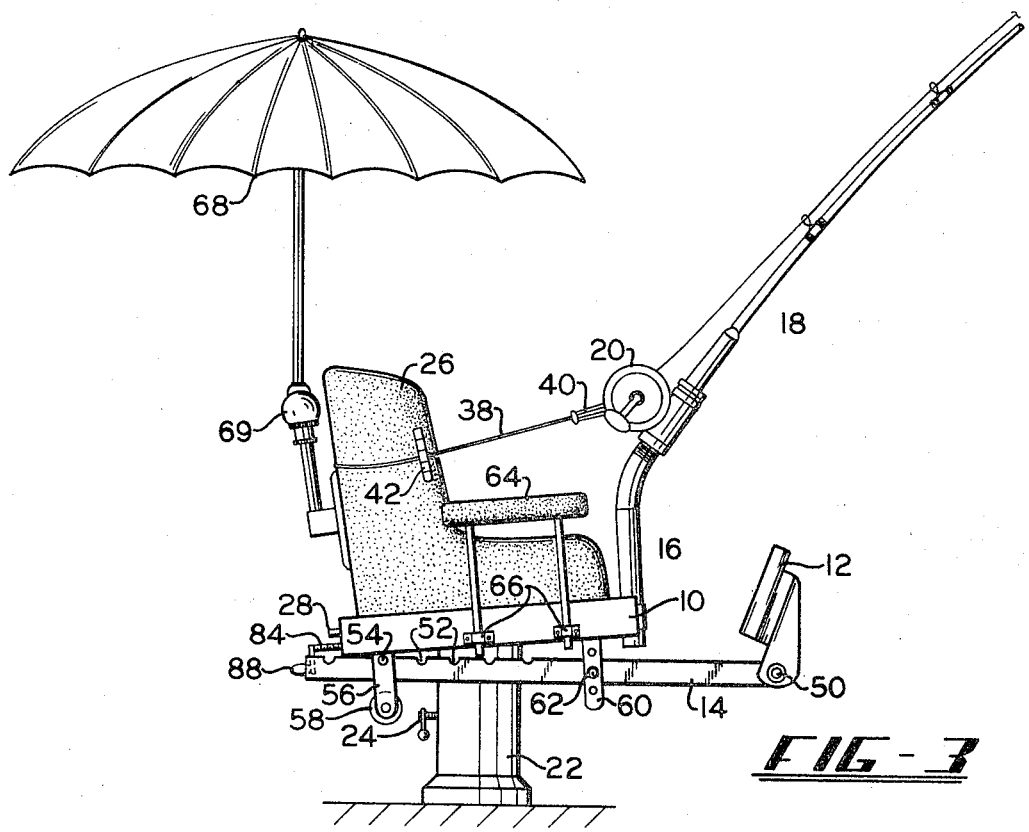
FIG. 3 is a side elevation, like FIG. 1 but illustrating the chair in greater detail.
Figure 4:
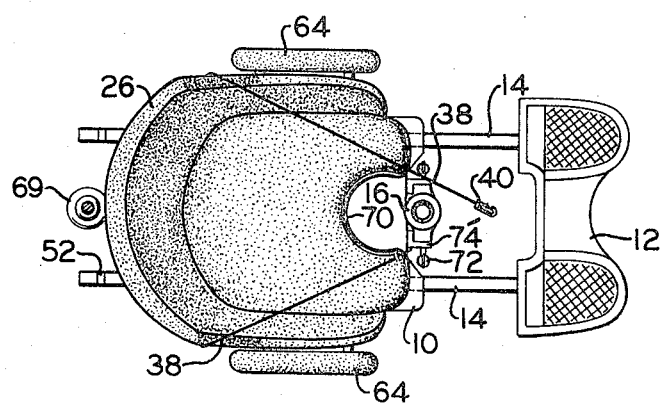
FIG. 4 is a plan view of the chair of FIG. 3.

FIGS. 3 and 4 show in somewhat greater detail the construction of the fishing chair of the invention. More specifically, foot rest 12 is made angularly adjustable at 50 on the flat bars 14. The flat bars 14 are quickly adjustable in and out of the base 10 to provide for fishermen of different leg length in the chair. This is accomplished by providing spaced notches 52 along the top of the rear ends of the bars 14, any selected notch engaging with a pin 54 held in a clevis 56 extending downwardly from the base 10. The lower end of each clevis 56, and there are two, rotatably supports a roller 58 on which the bars 14 roll when the foot rest 12 is raised to move the bars 14 in or out. A second set of clevises 60 extend down from the front of the base 10 and support the bars 14, a bolt 62 in selected holes in each clevis adjustably controlling the height of the foot rest 12 in relation to the base 10.

The release of the lock 24 allows the chair assembly to turn on a vertical pivot around the pedestal 22 under the pull of the fish so that the rod 18 always points substantially in the direction of the fish regardless of where he runs in relation to the boat.

Arm rests 64 are provided at the sides of the chair, and provision is made for vertical adjustment at 66.

A very worthy addition to the chair is an umbrella 68 which, by means of a quick-release, spring loaded ball joint 69, can be adjusted to and locked in the position best adapted to protect the fisherman.

FIG. 4 shows how the seat of the chair 26 is cut out at 70 at its front center to allow the rearward sliding movement of the chair on the base 10 without the chair striking the socket 16 of the butt of the rod 18. By this construction the butt end of the rod 18 is positioned well up into the crotch of the fisherman, and the fishing reel 20 is between or is closely adjacent to the fisherman's knees making winding thereof easy as the chair is moved fore and aft to "pump" the rod and the fish.

The socket 16 receiving the butt end of the rod 18 is made vertically adjustable by providing a spaced pair of angles 72 secured to the base 10 and having a plurality of vertically spaced holes selectively receiving spring pressed pins 74 extending laterally of the socket 16. In this manner even different size sockets to receive different rod sizes or butts can be quickly installed and at the desired height to best suit a particular fish being played or a particular fisherman or fisherwoman in the chair.

It is believed that from the foregoing the structure and operation of the improved fishing chair will be understood. The chair can be used with a conventional fishing harness for big game fishing, but it is easier and more convenient to eliminate the harness and merely use the cables 38 and the quick release snaps 40 securing to the reel. The pull of the fish itself pulls the chair 26 completely along the rods 28 on the base 10 until the bearings 32 strike the bracket supports for the ends of rods 28 limiting rearward travel of the chair toward the fish. Now with knees bent and rod tip down the fisherman can "strike" the fish by bringing the rod tip up quickly to the position of FIG. 1. And after "striking" the fish with arms and back, and by quickly straightening his legs, the fisherman can begin the "pumping" operations on the fish using his leg muscles, as already described.

The fishing chair of the invention is quickly adapted to fishermen or women of different size, leg length, and strength, usually by quickly adjusting the foot rest 12 in or out, and if necessary by changing the angle thereof by means 50. However, the invention teaches the provision of mechanism for adjusting the fore and aft sliding movement of the chair 26 on the base 10. This can be accomplished, as best seen in FIGS. 1 and 2, by providing a forwardly extending bracket 80 on the base 10 under each rod 28, this bracket 80 slidably carrying in guide 81 the angle 82 supporting the forward end of rod 28. The straight, threaded stem 84 of a crank 86 threads into a tapped hole in the angle 82 so that when the knob 88 of the crank 86 is used to rotate the crank the angle 82 is repositioned fore or aft to change the distance or stroke of travel of the chair 26 on the base 10.

The skilled fishing captain will see to it that the chair and fishing rod utilized in fishing for specific game fish are all properly coordinated to the person fishing in the chair. The length of the fishing rod is a factor in the distance of the "pumping" stroke, as are the vertical height of the socket 16 in its supporting brackets 72, and the distance of movement of the chair as the fishing person straightens their legs. On smaller and lighter weight fish one or more of the factors can be adjusted to increase the length of the "pumping" stroke. Also, some fishermen may prefer more knee bend than others or a different length total leg stroke. These differences can be readily provided for.

Thus, in the fishing chair of the invention, instead of using the left arm and back to pump and hold the fish, the fisherman uses his heavy leg muscles which are at least five times as strong. A constant pressure can be kept on the fish who actually pulls the chair on its slides towards the fish as the fisherman bends his knees. At any time the fisherman can rest if needed with knees bent and the chair at the end of its movement towards the fish because the reel 20 mounted on the fishing rod 18 is secured by cable 38 to the back of the chair by adjustable brackets 42.

While in accord with the Patent Statutes one best known embodiment of the invention has been particularly illustrated and described, it will be understood that the invention is not limited thereto or thereby, but that scope of the invention is defined in the appended claims.

What is claimed is:

1. A big game fishing chair including a base, a socket pivotally mounted on the base to receive the butt end of a fishing rod, a foot rest on the base, a chair slidably mounted on the base and movable to and from the socket and foot rest, restraining means releasably securing the chair to said fishing rod at a point spaced vertically of the socket to establish a fixed distance therebetween, movement of said chair away from said socket and foot rest causing said fishing rod to be moved about its pivotal mounting pulled in the direction of movement by said restraining means.

2. The combination defined in claim 1 wherein the restraining means extend from the back of the chair to a reel mounted on the fishing rod, and are adjustable in height and length.

3. The combination defined in claim 1 wherein the socket is vertically adjustable in relation to the base, and is quickly releasable therefrom.

4. The combination defined in claim 1 wherein the foot rest is adjustable vertically, horizontally, and angularly in relation to the base.

5. The combination defined in claim 1 wherein the base is mounted on a pedestal for movement about a vertical axis, and means for locking the base to the pedestal.

6. The combination defined in claim 1 wherein means are provided for adjusting the distance that the chair slides on the base.

* * * * *